INVENTORS:
EDWARD E. GIBBS,
ALMY D. COGGESHALL,
HAROLD R. SHIRK,

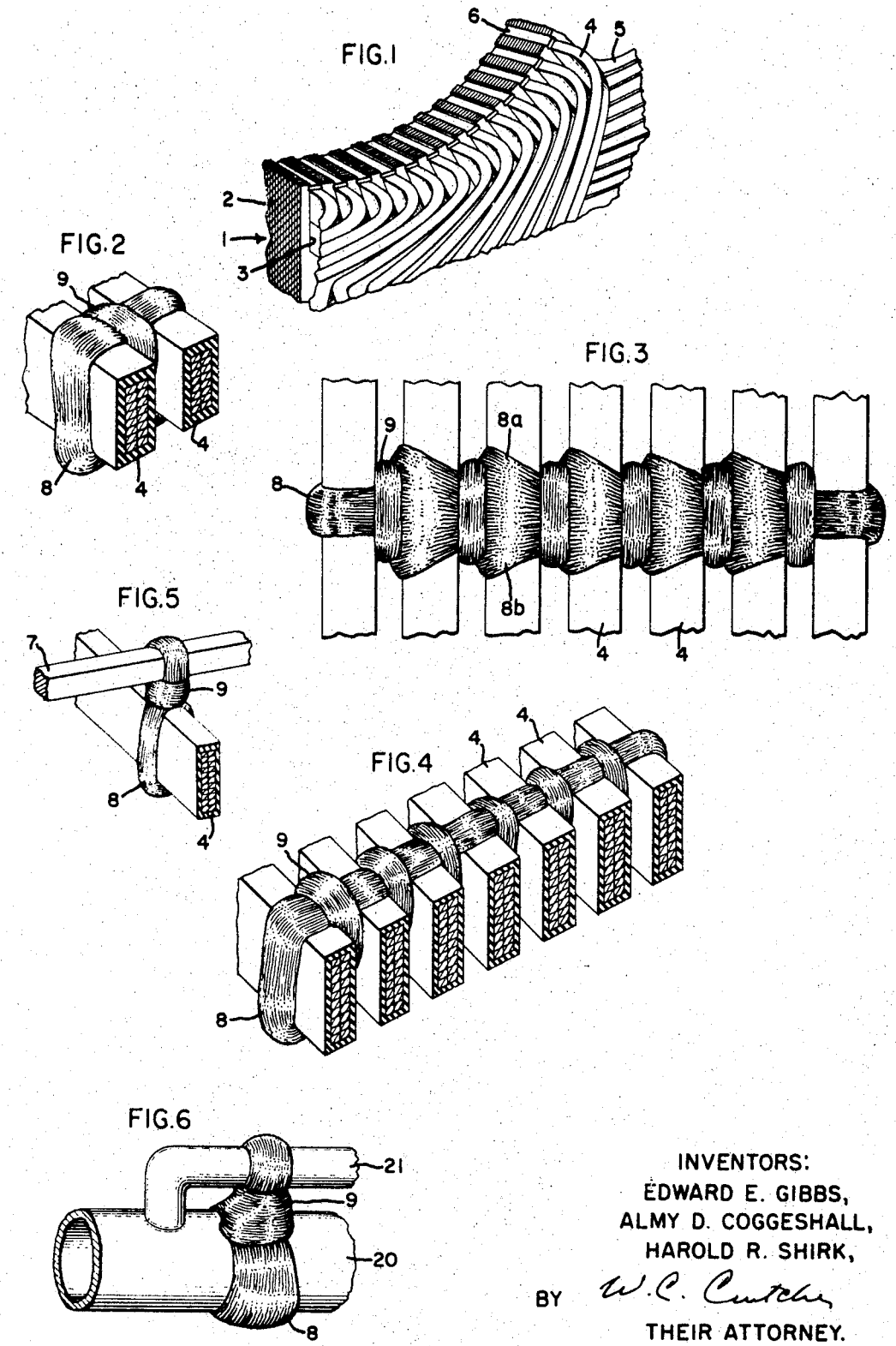

BY *W. C. Crutcher*

THEIR ATTORNEY.

United States Patent Office 3,437,859
Patented Apr. 8, 1969

3,437,859
WINDING SUPPORT STRUCTURE FOR A
DYNAMOELECTRIC MACHINE
Edward E. Gibbs, Almy D. Coggeshall, and Harold R.
Shirk, Schenectady, N.Y., assignors to General Electric
Company, a corporation of New York
Filed May 23, 1966, Ser. No. 552,171
Int. Cl. H02k 3/46
U.S. Cl. 310—260                    8 Claims

ABSTRACT OF THE DISCLOSURE

A support structure for spaced dynamoelectric machine windings employing resin-impregnated roving arranged as wrap-and-frap bindings providing integral tension-compression modules holding the windings in place.

This invention relates generally to a non-conducting support structure. More particularly, it relates to an improved non-conducting support structure for the rigid support of spaced electrical conductor members in a dynamoelectric machine, and to an improved method of supporting spaced electrical conductors.

One environment for the practice of this invention is in the end windings of the stators of dynamoelectric machines, such as generators. In the stator windings of a generator, there are high currents producing powerful magnetic fields and considerable heat, which in turn create forces tending to distort the windings. In the body of the stator, the windings are held firmly within the stator slots by keys or wedges. However, outside the stator slots, the end portions of the windings present support problems which vary in magnitude with the size of the machine. The forces mentioned above act on the conductor bars to produce undulations of the end windings relative to one another in a more or less independent movement.

The end turns of a dynamoelectric machine stator are the projecting portions of the armature windings or bars which extend outwardly from longitudinal stator slots. The end turns are necessary in order to complete the circuits within the stator, and in their end portions they assume a configuration of more or less skewed cantilever beams in two concentric and substantially conical arrays. These armature bars are spaced but relatively close together in a pattern. It is desirable to mechanically fix these end windings into a rigid, integral structure, and then to bind this structure to the stator frame for maximum resistance to the aforementioned distorting forces.

A suitable structure for supporting the insulated armature bars in the end turn region must afford support in the presence of thermal expansions and contractions of the bars, and magnetic forces on them resulting from the high currents. Moreover, it must be of a non-conducting material so as not to give rise to undesirable eddy currents or short circuits. Furthermore, it would be desirable to make the support structure as simple as possible because of the limited space for its accommodation. Since the spaces in which it must fit are irregular, the structure should be able to conform to the irregularities to provide uniform support.

Previous support structures have involved conductors lashed to rigid axial members or rigid annular rings or various combinations of these. In addition, solid spacer blocks of Textolite or similar material have been wedged between adjacent conductors. Also, conforming pads of pliable material which are later cured to a rigid state have been used to obtain better conformance between the rigid conductors and the rigid support members. However, such supports tend to be complicated due to the use of a number of different parts. Furthermore, where pliable or conforming materials have been used, they have been shoved or squeezed into place and this necessitated their having enough integrity so that they could be pushed into a tight spot without buckling or collapsing. Furthermore, such mechanically assembled parts of necessity have clearances, however small, therebetween, which permit movement of the members.

Accordingly, it is an object of the present invention to provide an improved means for mechanically fixing the separate components of the end windings of a dynamoelectric machine stator into a relatively rigid integral structure.

Another object is to provide an improved method of supporting electrical conductors in the ends of a dynamoelectric machine, or other spaced members subject to forces tending to displace them.

Another object is to provide an improved method of supporting independently acting electrical conductors at the ends of a dynamoelectric machine, into a rigid monolithic generally conical structure by which compressive, tensile and shear forces on individual conductors are resisted.

Another object is to provide an improved means for blocking, spacing, and binding the end windings of a dynamoelectric machine by which localized forces on the windings are confined to their area of origin so as to not to be transmitted to remote areas of the end winding.

Other objects, advantages and features of the present invention will become apparent from the following detailed description thereof when taken in connection with the accompanying drawing.

Briefly stated, in one of its aspects, the present invention is practised by binding two or more adjacent armature bars or members of associated supporting framework together by passing "wrapping" turns of non-conducting roving material around at least two adjacent bars, then drawing the structure up tight with "frapping" turns between the bars that cinch down on the "wrapping" turns and fill the space between bars to provide blocking resisting compressive forces. The roving material contains a resin, present in sufficient excess, which is then cured at room temperature, with the "frapping" turns serving to tighten the "wrapping" turns and to block adjacent bars apart, and the resin by virtue of its filling action to provide firm adhesion.

In the drawing:
FIG. 1 is a partial perspective view looking into the stator of a dynamoelectric machine adjacent to its end windings.

FIG. 2 is a perspective view of a "wrapping" and "frapping" tie between a pair of parallel conductors.

FIGURE 3 is a plan view of a "crowfoot tie" which is a series of "wrapping" and "frapping" ties in a single line binding and spacing a plurality of parallel conductors.

FIG. 4 is a perspective view of another "wrapping" and "frapping" tie used to bind and space a plurality of parallel conductors together.

FIG. 5 is a perspective view of a "pillar tie" between a support ring and a conductor bar, a pillar tie being an embodiment of a wrapping and frapping tie and applied to relatively skewed members.

FIG. 6 is a perspective view of a "pillar tie" between two pipe members.

Figure 7:
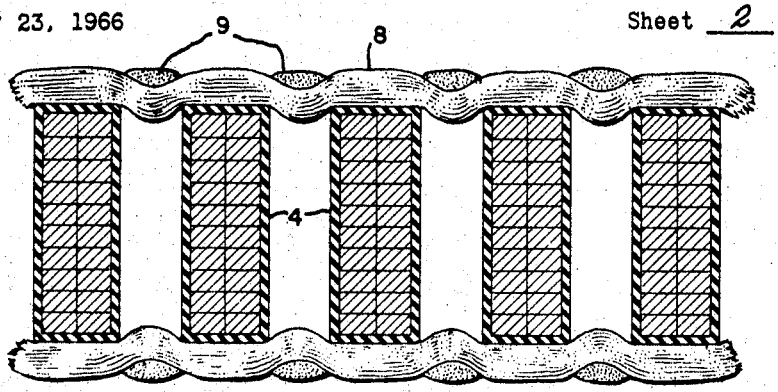
FIG. 7 is a fragmentary cross sectional view looking along the conductors of FIG. 4.

Referring now to FIG. 1, a lower end portion of a generator stator is generally indicated at 1. The stator 1 comprises a laminated core 2 defining slots 3 in which radially inner and radially outer armature conductor bars 4 and 5 are held by wedges 6. Conductor bars 4 and 5 extend longitudinally along slots 3 within the core 2 and where the bars 4 and 5 emerge from the core at its ends, they are skewed in opposite directions and brought around to reenter the core in slots displaced circumferentially from those, as at 3, from which they emerged. Circumferential loops 7 (FIG. 5), coaxial with stator 1 may be used for additional support of the skewed end windings of bars 4. These hoops may be radially inward, outward or between bars 4.

The foregoing structure is all well known and is set forth only as an illustration of an environment of the present invention. The following description concerns the essence of the invention. Referring to FIG. 2, adjacent spaced conductor bars, such as 4, are shown wound or wrapped together by "wrapping" turns 8 of a resin-saturated nonconducting roving material as, for example, glass fiber. The roving material or binding is then wound in a direction 9 such that the roving is between the objects to be joined and is passed in tension around the wrapping turns 8. In its original nautical usage, the word "frapping" indicates a winding such as at 9 whose sole purpose was to cinch down on wrapping turns, such as 8, increasing their tension. The term "frapping" herein is used to identify such windings as at 9; however, in the present invention, these "frapping" ties have multiple purposes. One purpose is to cinch down on the wrapping turns 8 increasing their tension and thus tightening the mutual ties between adjacent bars such as 4. Another purpose of the frapping binding is to fill the space between adjacent bars such as 4 and provide compression blocking therebetween. The non-conducting material used for these bindings is a non-woven type roving or fibrous material. This allows it to spread laterally when it is tensioned around another member thus intimately and conformably filling the available space. This compression blocking is accomplished simultaneously with the tensioning or cinching of the wrappings as frapping turns 9 are wound around wrapping turns 8. The number of turns can be varied depending on available space. The resulting combination of wrapping and frapping turns is resin-cured to a rigid state and results in an internally bonded compression-tension-shear module of high strength and rigidity.

FIGS. 3–6 show the use of the wrapping and frapping turns in other modes. In FIG. 3, a plurality of parallel spaced armature conductors bars such as 4 or 5 are bound together by wrapping and frapping. The wrapping turns 8 are kept in a straight line, and not staggered, by bifurcating each wrapping tie so that one-half thereof lies on each side of the one preceding it as shown at 8a and 8b. The frapping turns 9 cinch the binding together in a unitary body. FIG. 4 shows an alternative wrapping and frapping of a plurality of parallel spaced bars. Unlike the "crow foot" tie of FIG. 3, this one comprises a single wrapping turn 8 and frapping turns 9 between adjacent conductor bars. This embodiment enables the wrapping to be in a single line also as in FIG. 3. This avoids bending stresses in the conductor bars which might result from staggering. Relating to the embodiments shown in FIGS. 3 and 4, is the sectional view of FIG. 7. This view illustrates an additional feature of the present invention. When wrapping 8 is cinched down by frappings 9 between conductor bars 4, it will be appreciated that there will be local constrictions in wrapping 8 as shown. These constrictions will result in a mutual keying action so that elements 8 and 9 become locked together by virtue of their mechanical interference as well as their chemical adhesion, adding to the rigidity of the system and serving to localize the distorting forces on the system.

In FIG. 5, the radially inner armature conductor bars 4 are shown bound to support hoop 7 in what is known as a "pillar tie."

FIG. 6 shows a "pillar tie" similar to FIG. 5 but in a general environment of two spaced and rigidly supported objects, such as, for example, a pipe 20 and an elbow 21.

Figure 8:
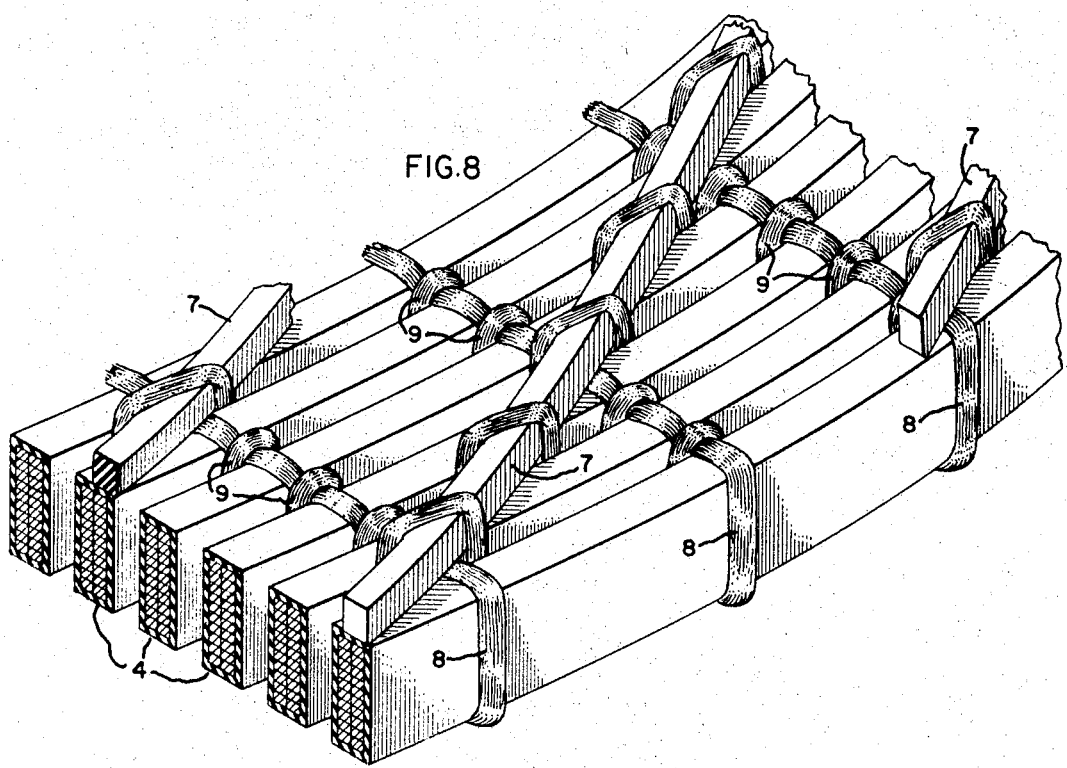
FIG. 8 is a perspective view of a triangular arrangement of the bindings of this invention.

FIG. 8 shows, in plan view, wrappings 8 arranged so that, as a whole, there results a pattern of triangular units which may be used to add rigidity to the system since the triangle is the most rigid of articulate structures.

Figure 9:
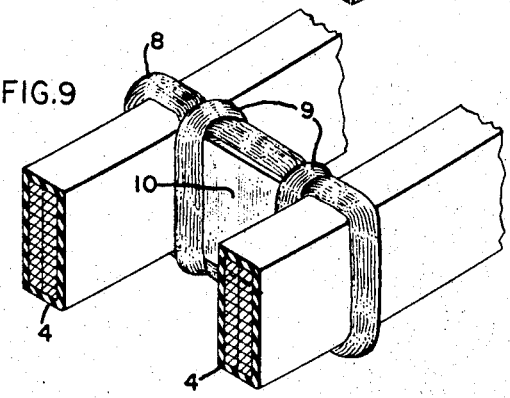
FIG. 9 is a perspective view of another embodiment of the present invention.

FIG. 9 shows a wrapping and frapping arrangement which is useful where the bodies 4 are substantially separated. To avoid the bulk of frapping tie that would normally be required in the wide space, a spacer member 10 is inserted between elements 4 and the winding is then applied in the same manner as if the spacer member were simply another of the members 4.

In one method of application, the non-conducting roving used for the wrapping and frapping support ties of this invention is drawn through a polymerizable resin such as polyester or epoxy resin, of a low viscosity, so that the resin content of the composite of roving and resin is less than about 40% by weight. The resin might be in the range of 25–1000 centipoises, though at present 100–400 is preferred. The foregoing figures are supplied by way of illustration and not of limitation. In this condition the resin film on the roving is quite thin and imparts a certan lubricity to the surface of the roving material. The roving is thus more readily drawn tightly into its wrapping and frapping ties. The non-woven characteristic of the roving combined with the lubricating action of the resin cause the fibers to splay out sidewise upon tightening the turns and thus accomplishes more complete filling of the spaces between conductors with more complete bonding of the ties to the conductors.

In another method of application, the roving can be applied in a substantially dry or at least tack free form, whereupon the resin, as above described, can be applied to make the roving wet with a degree of lubricity as is required for a proper tightening of the roving turns. Either of these methods of application results in a liquid bonding between the support structure and the supported members. In other words, the result is as if the support structure were poured or cast in place, as compared to prior art structures wherein blocking members are only in an abutting relation between conductor bars.

While the present invention contemplates resins curable at elevated as well as low temperatures, the resin is preferably one that is curable at room temperature rather than at an elevated temperature. This is so that after curing, the ties will be made even tighter upon thermal expansion of the bars during operation. If the resin were cured at elevated temperature, there would tend to be loosening upon contraction when the structure is cooled from the baking temperature.

The support ties and the support method of this invention thus provide an improved means and method of blocking, spacing, and binding the end windings of a dynamoelectric machine stator into an integral rigid structure. Furthermore, the method of blocking, spacing and binding lends itself to simpler construction. Therefore, the end result is a better structure, more simply made.

While the present invention has been described in the environment of the end windings of a dynamoelectric machine stator, it is within the contemplation of the invention to use such blocking and spacing means and method in any appropriate environment where spaced bodies require rigid relative support.

It will occur to others of ordinary skill in the art to make modifications of this invention which will remain within the concept and scope thereof and will not constitute patentable departure therefrom. Accordingly, it is intended that the invention be not limited by the details in which it has been described but that it encompass all within the purview of the following claims.

What is claimed is:

1. A method of rigidly fixing spaced bodies relative to each other in both tension and compression comprising the steps of:
   (a) binding said spaced bodies by wrapping ties of non-conducting roving material therearound, and
   (b) blocking said spaced bodies from each other by frapping ties of said non-conducting roving material therebetween and around said wrapping ties, said frapping ties being wound in tension to cinch said wrapping ties and in sufficient quantity to spread laterally against adjacent spaced bodies.

2. The method defined in claim 1 in which said roving material is impregnated with a curable resin of a viscosity in the range of 25–1000 centipoises.

3. The method according to claim 2 further including the step of curing the resin in said roving material to transform said wrapping and frapping ties into solid tension and compression members respectively.

4. A structure for the relative rigid support of spaced bodies in both tension and compression, comprising:
   (a) a binding of non-conducting roving material impregnated with curable resin and wrapped around said spaced bodies,
   (b) a blocking of said non-conducting roving material impregnated with curable resin and frapped in tension around said binding and between said spaced bodies, said blocking being in lateral abutting relation with adjacent pairs of spaced bodies.
   (c) said resin being cured to a rigid state.

5. The structure according to claim 4 in which one of said spaced bodies is a conductor bar of a dynamo-electric machine.

6. The structure according to claim 4 in which said binding is progressive to a next adjacent spaced body, said roving being passed between said wrapped spaced bodies and bifurcated to lie on each side of said binding as in a "crowfoot tie," said progressive binding being substantially along a straight line.

7. The structure according to claim 4 in which said binding is wrapped to embrace more than two spaced bodies at once.

8. The structure according to claim 4 in which said spaced bodies are skewed relative to one another.

References Cited

UNITED STATES PATENTS 2,994,735   8/1961   Marshall _____ 310—270

WARREN E. RAY, *Primary Examiner.*

R. SKUDY, *Assistant Examiner.*

U.S. Cl. X.R.

29—596; 174—138; 310—270